Patented Dec. 15, 1925.

1,565,300

UNITED STATES PATENT OFFICE.

ALFRED H. WHITE, OF ANN ARBOR, MICHIGAN, ASSIGNOR TO JOHN E. ALEXANDER, OF PORT EDWARDS, WISCONSIN, AND E. G. GOODELL, TRUSTEES, OF STEVENS POINT, WISCONSIN.

PROCESS FOR REDUCING SULPHATES AND THE LIKE.

No Drawing.   Application filed October 18, 1924. Serial No. 744,410.

*To all whom it may concern:*

Be it known that I, ALFRED H. WHITE, a citizen of the United States, and a resident of the city of Ann Arbor, in the county of Washtenaw and State of Michigan, have invented certain new and useful Improvements in a Process for Reducing Sulphates and the like; and I do hereby declare that the following is a full, clear, and exact description of the same.

This invention relates to the reduction of salts of oxyacids of sulphur such as the sulphates or sulphites to form sulphites or sulphides.

The usual method of preparing sulphides from sulphates is to heat the latter with carbon. It has been found that under 950° C. with a mixture of $Na_2SO_4 + 4C$ for CO or $Na_2SO_4 + 2C$ for $CO_2$ the reaction is barely noticeable. At 950° C. the reaction is rapid and uniform.

The high temperature and the corrosive action of the fused mass destroys the lining of the smelter and the high temperature volatilizes part of the sodium and sulphur compounds which create a nuisance in the neighborhood of the plant.

It is an object, therefore, of the present invention to provide a process by which the reduction may take place at a lower temperature.

Other objects of the invention will hereinafter appear.

I have found that if the reduction is carried out in the presence of a metallic oxide capable of uniting with carbon dioxide at the temperature at which reduction of the sulphate occurs, the temperature at which reduction commences is greatly lowered.

The cause of the high temperatures required when no oxide is added is the fact that the reduction of sodium sulphate is endothermic, as shown by the following equation:

$Na_2SO_4 + 2C = Na_2S + 2CO_2 - 44,800$ Cal.

The reaction between CaO and $CO_2$ on the other hand is strongly exothermic, $2CaO + 2CO_2 = 2CaCO_3 + 90,700$ Cal.

Hence when lime is added to the furnace charge the algebraic sum of the heats of reaction becomes exothermic instead of endothermic,

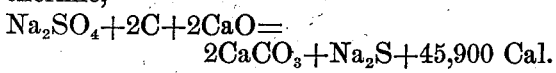
$2CaCO_3 + Na_2S + 45,900$ Cal.

It is not essential that sufficient lime be present to combine with all of the carbon dioxide as indicated by the equation, but there should be enough to give a positive or at most only a slightly negative heat of reaction. My experiments have shown that the above reaction takes place quite quantitatively at 700° C.

The presence of lime or other similarly acting oxide not only aids the reaction by liberating heat but also by continuously absorbing the carbon dioxide produced in the process of reduction. The reaction between the sulphate and carbon is a reversible one and consequently the equilbrium point may be changed by continuously withdrawing one of the reacting substances.

The formation of calcium or other carbonate upon which the present invention turns is reversible by heat, the dissociation pressure of calcium carbonate being as follows:

|  | mm. |
|---|---|
| 500° C | 0.073 |
| 600° | 1.84 |
| 700° | 22.2 |
| 800° | 167 |
| 900° | 793 |
| 1000° | 2942 |

If, therefore, absorption of carbon dioxide is to take place at the normal atmospheric pressure prevailing in the furnace the temperature should be kept below 900° C.

The limiting temperature will vary with the oxide employed. Thus with sodium carbonate the dissociation pressures are considerably lower for the same temperature, than those for calcium carbonate as will be evident from the following table:

|  | mm. |
|---|---|
| 700° C | 1 |
| 820° | 2.5 |
| 999° | 12 |
| 1150° | 28 |
| 1200 | 41 |

On the other hand magnesium carbonate is largely dissociated at 200° C.

In general the heat of reaction between the oxide and carbon dioxide is greater, the higher the carbonate has to be heated to bring about decomposition.

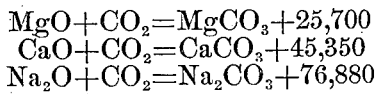
$$MgO+CO_2=MgCO_3+25,700$$
$$CaO+CO_2=CaCO_3+45,350$$
$$Na_2O+CO_2=Na_2CO_3+76,880$$

While I have referred to the use of an oxide I intend to include by this term the hydrated oxides or hydroxides or other compounds which yield the oxide at the temperature at which reduction takes place.

In the Leblanc process calcium carbonate, sodium sulphate and carbon are heated together to about 1000° C. The mass becomes pasty and when it is drawn from the furnace the product consists chiefly of calcium sulphide and sodium carbonate with other compounds in minor amounts. In the present case the final products are sodium sulphide and calcium carbonate. These do not react together as they do in the Leblanc process probably on account of the temperature being too low.

In general my process is applicable to the reduction of sulphates reducible to sulphide by heated carbonaceous material with the absorption of the heat. Where the reduction is accompanied by the evolution of heat there is little need of lime to aid the reaction. The following table gives the heat of reaction between the metallic sulphate and carbon to form sulphide and carbon dioxide in the absence of any absorbent for the latter.

| $Al_2(SO_4)_3$ | −171,300 |
|---|---|
| $SrSO_4$ | −86,490 |
| $MnSO_4$ | −79,060 |
| $K_2SO_4$ | −46,800 |
| $Na_2SO_4$ | −44,800 |
| $BaSO_4$ | −43,300 |
| $MgSO_4$ | −28,100 |
| $Li_2SO_4$ | −24,770 |
| $CaSO_4$ | −24,420 |
| $NiSO_4$ | −20,400 |
| $FeSO_4$ | −20,300 |
| $PbSO_4$ | −1,910 |
| $CuSO_4$ | +23,350 |
| $Ag_2SO_4$ | +29,900 |
| $HgSO_4$ | +39,500 |

From the foregoing table it will be seen that my process is particularly applicable to sulphates of metals of the alkali, alkaline earth and iron groups.

The invention is also suitable for the reduction of sulphites, thiosulphates and so forth to sulphides as well as to the reduction of sulphates to sulphites or thiosulphates.

While my process is applicable to the reduction of sulphates in general it is especially adapted for the regeneration of the alkaline solutions used in the sulphate process of producing paper pulp from wood.

In this process the wood is cooked with a solution containing caustic soda and sodium sulphide and the residual liquors are recovered by evaporation and calcination. The loss in alkali is made up by adding sodium sulphate to the black ash resulting from the calcination of the waste liquors.

According to my present process lime and carbonaceous material are added to this black ash and the mixture heated in the absence of air to around 700° C.

In one experiment, 1500 g. of calcium carbonate in the form of whiting and 1930 g. of sodium sulphate in the form of Glauber salt were mixed and burned in a small rotary lime kiln at a temperature of 900° C. The composition of the material after burning was as follows:

|  | Per cent |
|---|---|
| CaO | 52.77 |
| Sulphate S | 10.00 |
| Sulphide S | 0.09 |

This material from the lime kiln in the form of small lumps was placed in a crucible with 10% of its weight of powdered charcoal and a cover of a layer of charcoal and was heated in a gas furnace at 700° C. for two hours. During the heating the charcoal cover burned away and, when removed from the furnace, the top layer of material was found to be white in color and not reduced. All of the material below this top layer consisted of pink lumps in which the sulphate was completely reduced to sulphide as shown by the following analysis:

| Sulphate S | Trace. |
|---|---|
| Sulphide S, soluble in water | 9.55% |
| Sulphide S, insoluble in water | 0.86% |

On leaching the pink lumps, referred to above, with hot water and filtering, the clear solution showed a composition corresponding to the following composition of the dry material:

|  | Per cent |
|---|---|
| $Na_2S$ | 23.4 |
| $Na_2CO_3$ | 1.9 |
| NaOH | 2.4 |

Other experiments have shown that this reduction takes place readily at temperatures of 600° C. and this is not the lowest temperature limit although with lower temperatures a longer time would be required for the reaction. Experiments at 900° C. at which temperature calcium carbonate is largely dissociated have shown very little reduction.

The valuable effect of the calcium oxide is shown by an experiment where sodium sulphate was mixed with 50% of its weight of charcoal and heated in a covered crucible for two hours at 700° C. Analysis showed that no sulphate had been reduced to sulphide.

As a further illustration of the usefulness of my new process I will cite a case where black liquors from the sulphate process of pulp manufacture were mixed with lime and then burned in a rotary lime kiln under the usual oxiding conditions. This lime was then mixed with 10 per cent of charcoal and heated in a closed crucible at 700° C. for two hours. The analysis of the reduced product showed:

| | Per cent |
|---|---|
| Sulphate S | 0.08 |
| Sulphide S | 2.01 |
| Total S | 2.09 |

This material was leached with hot water and the following content of soluble products found:

| | Per cent |
|---|---|
| $Na_2S$ | 4.15 |
| NaOH | 19.00 |
| $Na_2CO_3$ | 4.31 |

In the foregoing illustrations I have used carbon and carbon monoxide as the reducing agents but any carbonaceous material which by oxidation produces carbon dioxide may be used and where the term carbonaceous material is used it is to be understood to cover all such compounds of carbon including carbon monoxide. When in the claims I speak of mixing a salt with carbonaceous material I desire to have this include the process of passing a gaseous carbon compound through the mixture while the reduction is taking place.

I am aware that numerous details of the process may be varied through a wide range without departing from the spirit of this invention, and I do not desire limiting the patent granted otherwise than as necessitated by the prior art.

I claim as my invention:

1. The process of forming metallic sulphide from a metallic salt of an oxygen acid of sulphur reducible to sulphide by heated carbonaceous material which includes heating said salt in the presence of carbonaceous material and an oxide of a metal, capable of reacting with carbon dioxide to form a carbonate with evolution of heat at the temperature at which such reduction is carried out, and sufficient in amount to form a carbonate with the principal part of the carbon dioxide evolved in the reduction, to a temperature above 300° C. and below the temperature at which the carbonate of the metal whose oxide was added, dissociates completely.

2. The process of forming metallic sulphide from a metallic salt of an oxygen acid of sulphur reducible to sulphide by heated carbonaceous material which includes mixing said salt with carbonaceous material sufficient to effect the reduction and with an oxide of a metal capable of reacting with carbon dioxide to form a carbonate with evolution of heat at the temperature at which such reduction is carried out and sufficient in amount to form a carbonate with the principal part of the carbon dioxide evolved in the reduction, and heating this mixture without access of air until reduction is substantially complete at a temperature above 300° C. and below that at which the carbonate of the metal, whose oxide was added, dissociates completely.

3. The process of forming metallic sulphide which includes heating the residues from the black liquor obtained in the manufacture of pulp from wood by the sulphate process and lime in the presence of carbonaceous material with exclusion of air at a temperature of 300–900° C. until the sulphate is substantially reduced to sulphide, and then leaching this reduced product to recover the sodium sulphide and other soluble salts.

4. The process of reducing metallic sulphates reducible by heated carbonaceous material which includes heating said salt, in the presence of carbonaceous material and an oxide of a metal capable of reacting with carbon dioxide to form a carbonate with evolution of heat at the temperature at which such reduction is carried out, without access of air to a temperature above 300° C. and below that at which the carbonate of the metal whose oxide was added dissociates completely, until the desired product is obtained.

5. The process of reduction of a metallic salt of an oxygen acid of sulphur to a sulphide which consists in mixing the said salt with sufficient carbonaceous material to effect reduction and sufficient quick lime to unite with enough of the carbon dioxide evolved in the reaction to render the algebraic sums of the heats of reaction of the whole mixture positive, and then heating this mixture in the absence of air at a temperature above 300° C. but below 900° C. until the reduction is substantially complete.

6. The process of forming sulphides from the sulphates of metals reducible to sulphides by heated carbonaceous material with the absorption of heat which includes heating the sulphate with a metallic oxide capable of uniting with carbon dioxide at the temperature at which such reduction is carried out.

7. The process of forming sodium sulphide from sodium sulphate which includes heating a mixture of sodium sulphate, calcium oxide and carbon to a temperature between 600° and 900° C. in proportions to form sodium sulphide and calcium carbonate.

8. The process of forming sodium sulphide from material containing sodium sulphate which includes heating a mixture of such material, calcium oxide and carbon to about 700° C. to form sodium sulphide and calcium carbonate.

In testimony whereof I have hereunto subscribed my name.

ALFRED H. WHITE.